United States Patent
Muthiah

(10) Patent No.: US 12,242,752 B2
(45) Date of Patent: Mar. 4, 2025

(54) PERFORMANCE INDICATOR ON A DATA STORAGE DEVICE

(71) Applicant: Western Digital Technologies, Inc., San Jose, CA (US)

(72) Inventor: Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 70 days.

(21) Appl. No.: 17/853,589

(22) Filed: Jun. 29, 2022

(65) Prior Publication Data
US 2024/0004573 A1    Jan. 4, 2024

(51) Int. Cl.
*G06F 3/06* (2006.01)
*G06F 11/30* (2006.01)
*G06F 11/34* (2006.01)

(52) U.S. Cl.
CPC .......... *G06F 3/0653* (2013.01); *G06F 3/0605* (2013.01); *G06F 3/0613* (2013.01); *G06F 3/0659* (2013.01); *G06F 3/0679* (2013.01); *G06F 11/3034* (2013.01); *G06F 11/3485* (2013.01)

(58) Field of Classification Search
CPC ...... G06F 3/061; G06F 3/0613; G06F 3/0617; G06F 3/0629; G06F 3/0653; G06F 3/0659; G06F 3/0679; G06F 11/3037; G06F 11/3041; G06F 11/312; G06F 11/324; G06F 11/3466
USPC ..... 710/15–19, 74; 711/154; 714/47.1, 47.2, 714/47.3
See application file for complete search history.

(56) References Cited

U.S. PATENT DOCUMENTS

| | | | | |
|---|---|---|---|---|
| 8,725,941 | B1 * | 5/2014 | Gilboa | G06F 3/0653 711/156 |
| 10,146,585 | B2 * | 12/2018 | Frandzel | G06F 3/0665 |
| 10,353,628 | B2 * | 7/2019 | Kachare | G06F 11/3034 |
| 10,353,743 | B1 * | 7/2019 | Frandzel | G06F 9/5038 |
| 10,534,648 | B2 * | 1/2020 | Frandzel | G06F 3/0665 |

(Continued)

FOREIGN PATENT DOCUMENTS

| WO | 2014098973 A1 | 6/2014 |
|---|---|---|
| WO | WO-2014132099 A1 * | 9/2014 |

OTHER PUBLICATIONS

Machine Translation of WIPO Publication WO-2014147735-A1, 2014. (Year: 2014).*

Primary Examiner — Steven G Snyder
(74) Attorney, Agent, or Firm — Patent Law Works LLP

(57) ABSTRACT

A data storage device comprising a non-volatile storage medium configured to store user data, a data port configured to transmit data between a host computer system and the data storage device, a display system, and a controller. The controller is configured to receive and execute one or more commands from the host computer system to cause a data transfer between the host computer system and the storage medium of the data storage device. The controller generates performance data representing the performance of the data storage device, wherein the performance data includes an efficiency ratio value representing a relative utilization of an operational capability of the data storage device in conducting the data transfer. The controller generates one or more control signals to cause the display system to visually indicate at least the efficiency ratio value of the performance data.

20 Claims, 7 Drawing Sheets

(56) References Cited

U.S. PATENT DOCUMENTS

| | | | |
|---|---|---|---|
| 10,564,888 B2 | 2/2020 | Shaked et al. | |
| 10,585,711 B2* | 3/2020 | Frandzel | G06F 3/0665 |
| 10,754,574 B1* | 8/2020 | Jo | G06F 3/0613 |
| 10,795,593 B2* | 10/2020 | Tarango | G06F 3/067 |
| 10,896,068 B1* | 1/2021 | Frandzel | G06F 9/4887 |
| 10,908,960 B2* | 2/2021 | Qiu | G06F 3/0679 |
| 10,908,966 B1* | 2/2021 | Frandzel | G06F 13/18 |
| 11,416,152 B2* | 8/2022 | Ishihara | G06F 3/0673 |
| 11,507,502 B2* | 11/2022 | Ravimohan | G06F 11/3034 |
| 11,886,922 B2* | 1/2024 | Wang | G06F 9/4887 |
| 12,045,467 B2* | 7/2024 | Chandrashekaraiah | G06F 3/0683 |
| 2004/0052045 A1* | 3/2004 | Botchek | G06F 1/181 |
| | | | 361/679.21 |
| 2009/0228823 A1* | 9/2009 | Edwards | G06F 3/0605 |
| | | | 715/765 |
| 2017/0364275 A1* | 12/2017 | Natarajan | G06F 12/0246 |
| 2019/0007284 A1* | 1/2019 | Doshi | G06F 11/3485 |
| 2019/0042128 A1* | 2/2019 | Tarango | G06F 11/3442 |
| 2019/0042142 A1* | 2/2019 | Casmira | G06F 3/0659 |
| 2019/0286363 A1 | 9/2019 | Benisty | |
| 2021/0034283 A1 | 2/2021 | Jung et al. | |
| 2021/0397917 A1 | 12/2021 | Chatterjee | |
| 2023/0266884 A1* | 8/2023 | Lee | G06F 3/0659 |
| | | | 711/103 |
| 2023/0305701 A1* | 9/2023 | Kanno | G11C 29/52 |
| | | | 714/755 |
| 2024/0231939 A1* | 7/2024 | Wang | G06F 9/4887 |

* cited by examiner

PERFORMANCE INDICATOR ON A DATA STORAGE DEVICE

TECHNICAL FIELD

This disclosure relates to a data storage device that stores and retrieves user data in response to commands of a host computer system, and provides a corresponding indication of the performance of the device to a user.

BACKGROUND

Data storage devices (DSDs) are electronic devices with the capability to store information in the form of digital data. DSDs are typically deployed as an integrated part of, or as a removable component configured to interface with, a computing system for the purpose of improving the data transmission and storage capabilities of the system. From the perspective of the computing system, a DSD is typically implemented as a block storage device where the data stored is in the form of one or more blocks, being sequences of bytes or bits having a maximum length, referred to as block size.

External DSDs are commonly used to supplement the data storage capabilities of a computer system. For example, external DSDs are often standalone physical devices which house an internal storage component, such as a hard disk drive (HDD) or a solid state drive (SSD), that provides a host computer system with an additional portion of non-volatile memory (i.e., the volume of the drive) in which to store digital data. These external drive type devices are connectable to the host computer system via a data path operating over a particular connectivity protocol (e.g., via Universal Serial Bus (USB) cable). In response to being connected to the host computer system, the host computer system recognizes the external drive as a block data storage device such that a user of the device may access the storage of the drive via the data path (e.g., through operation of the host computer system). Use of the drive typically involves a user accessing user data stored on the drive. Access to the user data occurs via one or more commands (e.g., data read or data write commands) that are transmitted to the DSD from the connected host computer system.

Some storage devices provide status or state information to users about the functionality of the data storage device, including, for example, information about the security capabilities of the device and the data stored thereon.

SUMMARY

Disclosed herein is a data storage device comprising: a non-volatile storage medium configured to store user data; a data port configured to transmit data between a host computer system and the data storage device; a display system; and a controller configured to: receive and execute one or more commands from the host computer system to cause a data transfer between the host computer system and the storage medium of the data storage device; generate performance data representing the performance of the data storage device, wherein the performance data includes: an efficiency ratio value representing a relative utilization of an operational capability of the data storage device in conducting the data transfer; and generate one or more control signals to cause the display system to visually indicate at least the efficiency ratio value of the performance data.

In some embodiments, the efficiency ratio is determined as a current value of an operational parameter of the data storage device against a corresponding maximum capability value of the operational parameter, as associated with the data transfer.

In some embodiments, the efficiency ratio is determined based on an IO rate type operational parameter, including: a data throughput of the data transfer; or an input/output operations per second (IOPS) of the data transfer.

In some embodiments, the controller includes a storage IO analysis module configured to: determine the IO rate type operational parameter; and process the one or more commands of the data transfer to determine the current value of the determined IO rate type operational parameter.

In some embodiments, processing the one or more commands of the data transfer includes processing the input/output activity of one or more memory buffers of the device to determine a data throughput value of the data transfer.

In some embodiments, processing the one or more commands of the data transfer includes determining an access pattern to characterize the storage and retrieval operations associated with the data transfer, wherein the access pattern comprises one or more of: a random/sequential access designation; a block size; and a read/write operation ratio, of the data transfer.

In some embodiments, the maximum capability of the IO rate type operational parameter is determined based on one or more properties of the data storage device.

In some embodiments, the maximum capability of the operational parameter is one of: a maximum data throughput; and a maximum total IOPS, supported by the data storage device.

In some embodiments, the maximum data throughput is determined by a host interface data rate.

In some embodiments, the maximum capability of the IO rate type operational parameter is determined based on the determined access pattern characterizing the storage and retrieval operations associated with the data transfer.

In some embodiments, the controller is configured to: determine, based on one or more prior access patterns of corresponding prior data transfers between the host computer system and the data storage device, a set of one or more workload profiles associated with the host computer system for the data storage device; process the determined access pattern to determine an estimated workload profile of the host computer system by matching the access pattern against the set of one or more workload profiles; and determine the maximum capability of the IO rate type operational parameter based on the estimated workload profile.

In some embodiments, the performance data includes: an availability value representing an un-utilized portion of the operational capability of the data storage device.

In some embodiments, the availability value is an availability ratio value determined as 1.0 minus the efficiency ratio value.

In some embodiments, the availability value is a difference between the current value of the operational parameter and the maximum capability of the operational parameter.

In some embodiments, the display system includes: one or more display indicators; and a display control circuit configured to: receive, from the controller, one or more display control signals; and process the display control signals to cause at least one of the one or more display indicators to display a representation of at least the efficiency ratio value of the performance data.

In some embodiments, the display system includes: a first display indicator being an absolute performance indicator; and a second display indicator being a relative performance indicator, wherein the display control circuit processes the display control signals to cause: the first display indicator to perform first display operations to display a representation of the current value of the operational parameter of the performance data; and the second display indicator to perform second display operations to display a representation of the efficiency ratio value of the performance data, and wherein the respective display operations of the first display indicator and the second display indicator are synchronized.

In some embodiments, the controller is further configured to: transmit the performance data to the host computer system, wherein the host computer system is configured to visually indicate the efficiency ratio on a display component of the host computer system.

In some embodiments, the efficiency ratio is one of: a device power utilization ratio determined based on a power consumption type operational parameter; and a device thermal emission ratio determined based on a thermal reading type operational parameter.

Disclosed herein is a method for providing performance indications of a data storage device, the method executed by a controller of the device and comprising: receiving and executing one or more commands from a host computer system to cause a data transfer between the host computer system and a non-volatile storage medium of the data storage device; generating performance data representing the performance of the data storage device, wherein the performance data includes: an efficiency ratio value representing a relative utilization of an operational capability of the data storage device in conducting the data transfer; and generating one or more control signals to cause a display system of the data storage device to visually indicate at least the efficiency ratio value of the performance data.

Disclosed herein is a data storage device comprising: means for storing user data; means for transmitting data between a host computer system and the data storage device; means for display; and means for receiving and executing one or more commands from the host computer system to cause a data transfer between the host computer system and the means for storing user data; means for generating performance data representing the performance of the data storage device, wherein the performance data includes: an efficiency ratio value representing a relative utilization of an operational capability of the data storage device in conducting the data transfer; and means for generating one or more control signals to cause the means for display to visually indicate at least the efficiency ratio value of the performance data.

BRIEF DESCRIPTION OF DRAWINGS

Some embodiments are described herein below with reference to the accompanying drawings, wherein.

DESCRIPTION OF EMBODIMENTS

Figure 1:
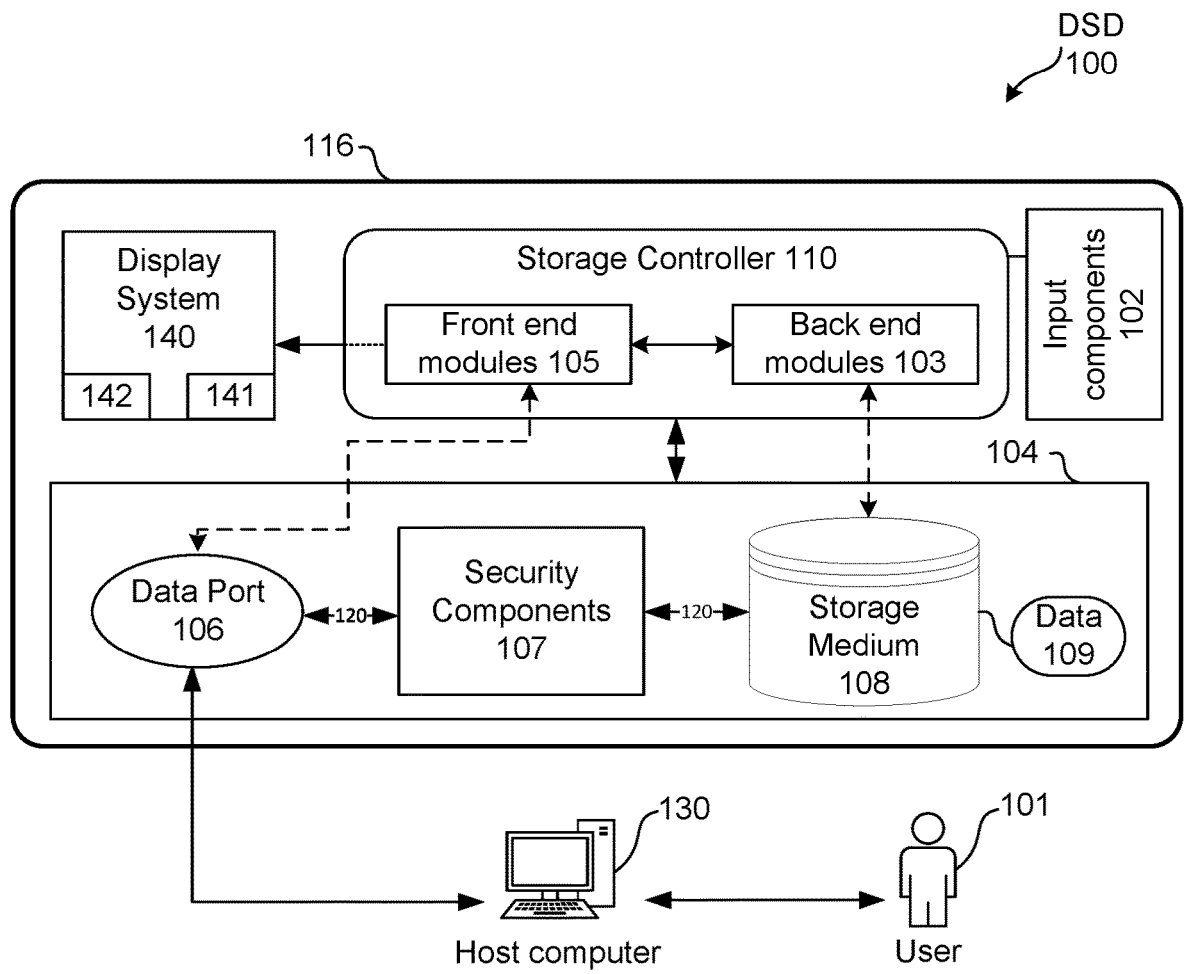
FIG. 1 illustrates an example data storage device (DSD) in accordance with some embodiments.

A data storage device (DSD) is utilized by a host computer system for the storage and retrieval of user data. It is often desirable to evaluate the performance of the DSD in conducting data storage and/or retrieval operations. Various parameters or metrics are useful to provide an indication of the performance of a DSD, including measures of data input/output (IO) throughput or a number of IO operations executed by the device.

There are a variety of different approaches for calculating values of the relevant performance parameters of the DSD, and for providing subsequent indications of performance to the user. In some conventional approaches, the performance of a DSD is assessed based on its maximum attainable performance (referred to as the "maximum operational capability") for a particular set of parameters. For example, values of the maximum data read and data write rates may be provided, such as for example, within device documentation supplied by the vendor or as stored electronically within the firmware of a controller of the device. A user may prefer a device with a higher maximum read and/or write capability over another device with similar properties (e.g., where the data storage capacity of both devices is the same).

The maximum operational capability of the device provides a simple and readily available metric to assess DSD performance. As the value is typically static, it may also be easily indicated to the user (e.g., via a label physically attached to the device). However, maximum capability values only provide the user with a theoretical representation of the device performance. In some circumstances, the user may require an indication of the actual performance of the device during use with a connected host system. The actual device performance varies in real-time as data is being transferred to and from the internal storage medium. Furthermore, the actual performance of the device may be influenced by the data access operations (i.e., the data read and/or write commands) executed by the connected host.

In one approach, the actual performance of the DSD is evaluated by the host computer system. The host computer system is configured to execute a diagnostic tool or software application that evaluates the ability of the DSD to store data to, and retrieve data from, an internal drive, based on a particular pre-specified sequence of read and write commands issued by the host to the DSD. In response to the execution of the issued commands, the host application performs a real-time measurement of the relevant parameters (e.g., data read rate).

This type of host application "benchmarking" is advantageous in that the processing and display capabilities of the host device are available to calculate and indicate the performance of the DSD to the user. However, a drawback of this approach is that the user must install and configure the diagnostic application on the host computer system.

A further disadvantage of conventional approaches for determining the performance of a DSD is the use of parameters that provide a representation of absolute device performance. For example, data IO rate values (e.g., measures of data read/written in MB/s) represent the raw data transfer performance of the device. However, the IO rates achievable during actual transfers of data to and from a connected host, and as a maximum capability, will depend on the hardware of the DSD (e.g., the properties of the memory blocks of the internal storage medium).

Therefore, some issues with existing approaches to assessing and indicating DSD performance include a reliance on: i) the host to provide visual indications of the actual performance of the device (i.e., in real-time during a data transfer) via a display component of the host (e.g., a monitor); and ii) absolute indications of performance (e.g., raw data read or write rates, such as MB/s values) which do not permit a fair comparison between devices with different hardware or other operational limitations. It is therefore desired to provide a data storage device that ameliorates one or more of these difficulties, or other difficulties, of the prior art or that at least provides a useful alternative.

With reference to FIG. 1, there is disclosed an exemplary data storage device (DSD) 100 that is configured to: (i) receive and execute one or more commands (e.g., involving data read and/or data write operations) from a host computer system 130 to cause a data transfer between the host computer system 130 and the storage medium of the DSD 100; (ii) generate performance data representing a relative measure of the performance of the DSD with respect to the data transfer; and (iii) instruct a display system of the device 100 to provide a user 101 with a visual indication of the performance. Specifically, the generated performance data represents a degree of the relative utilization of the capability of the DSD 100 in conducting the data transfer with the host computer system 130, where the utilization is determined as an efficiency ratio.

One or more operational parameters of the DSD 100 are used to quantify the efficiency ratio, where each parameter represents a particular capability of the device. For example, operational parameters may include an IO rate type parameter, such as a data throughput value or an input/output operations per second (IOPS) value, representing a data transfer capability to and from the internal storage medium 108 of the DSD 100. Alternative types of operational parameters include, for example, parameters that measure power consumption or thermal emission of one or more device components (i.e., such that the efficiency ratio is expressed as a power utilization ratio, or a thermal emission ratio).

The efficiency ratio is determined as a measured (current) value against a corresponding maximum capability value of an operational parameter of the DSD 100. In some examples, the operational parameter is an IO rate type parameter that is determined selectively, by a storage controller 110 of the DSD 100, in response to one or more of a user input to the DSD 100, and a determination of the one or more commands as random or sequential by the controller 110.

In some embodiments, the storage controller 110 is configured to determine the maximum capability of the DSD 100 from the properties of the data storage device 100 (e.g., host interface data rate). In some embodiments, the determined maximum operational capability of the DSD 100 is also influenced by the dynamic behaviour of the host computer system 130 (e.g., the commands issued by the host computer system 130 to the DSD 100). For example, in some configurations the controller 110 processes the read and write commands of the host computer system 130 to determine an access pattern characterizing the data IO operations, and thereby enabling the determination of a corresponding maximum capability of the operational parameter (e.g., a maximum IOPS for commands of the particular access type).

In some embodiments, the controller 110 is configured to perform a workload estimation of the data transfer associated with connected host computer system 130. For example, the controller 110 may initiate a workload estimation process to determine: a workload of the connected host computer system 130 on the DSD 100; and subsequently, an estimate of the maximum expected capability of the device to service the estimated workload. This is advantageous as it enables the DSD 100 to provide the user 101 with an indication of device performance that is agnostic of the properties of the host to device interface, and that is therefore of improved accuracy compared to the use of pre-specified maximum capability values derived solely from the properties of the DSD.

The DSD 100 includes one or more display components 142 configured to provide visual indications of the generated performance data. In some embodiments, the display components 142 include a combination of relative and absolute performance display indicators 144 configured to synchronously display relative performance values (e.g., an efficiency ratio between 0.0 and 1.0), and corresponding absolute operational parameter values (e.g., data throughput in MBPS, or IOPS) together in real-time. This improves the utility of the performance information presented to the user 101 via the display system 140.

The disclosed data storage device 100 is advantageous in that it: i) provides a determination of the device performance in real-time and dynamically while it is in use by a connected host (i.e., in response to the host issuing data read/write operations for the device to receive and execute), unlike approaches which rely on the maximum theoretical capability of one or more parameters (e.g., max read/write IO rates); ii) determines a relative utilization of the device's capabilities as an efficiency ratio, rather than as an absolute metric, which enables the user 101 to conduct a fair comparison between devices with different hardware or other operational limitations based on the generated performance data; iii) accommodates for the properties of both the device and the connected host in order to determine a maximum capability of the device operation, thereby improving the accuracy and usability of the performance data (i.e., the efficiency ratio); iv) displays the efficiency ratio, and related performance values, dynamically in response to the data access operations performed by the host computer system 130, and on the display system of the DSD itself, thereby improving over conventional approaches that rely on the connected host for indicating the performance to a user 101 (i.e., via the host display).

Therefore, the data storage devices described herein provide an improved solution for determining the relative data storage and retrieval performance of the device while it is in use by a connected host, and indicating the determined performance of the device to a user. This increases the practical utility of the device to the end user by enabling the user to easily and accurately gauge the degree to which the device is being utilized. In response to viewing the displayed relative utilization metric, the user may make improved decisions regarding device usage. For example, the user may operate the host to write additional streams of media data to the device, or switch the configuration of the host to a different mode, such as to increase data throughput (and therefore improve upon the determined degree of utilization).

Data Storage Device

FIG. 1 shows an embodiment of the DSD 100 comprising a data path 104, a storage controller 110, a display system 140 and a set of input components 102. The data path 104 comprises a data port 106 configured to transmit data between a host computer system 130 and the DSD 100. The DSD 100 is configured to register with the host computer system 130 such as to provide functionality to the host computer system 130 of a block data storage device. DSD 100 further comprises storage medium 108 to store user content data 109. The user content data 109 includes one or more blocks of data organized into files, for example including images, documents, videos, etc., according to a particular file system operable by the host computer system 130.

The storage medium 108 is non-transitory such as to retain the stored block data irrespective of whether the medium 108 is powered. The medium 108 may be a hard disk drive (HDD) with a rotating magnetic disk or a solid state drive (SSD) and its variations like SLC (Single Level Cell), eMLC (Enterprise Multi Level Cell), MLC (Multi Level Cell), TLC (Triple Level Cell), and QLC (Quadruple Level Cell), and combinations of the above such as SSHD. Any other type of non-volatile storage media may also be used, including emerging non-volatile memory such as Program in Place or Storage Class Memory (SCM), such as ReRam, PCM, and MRAM. Further, the storage medium 108 may be a block data storage device, such that the user content data 109 is written in blocks to the storage medium 108 and read in blocks from the storage medium 108.

The host computer system 130 is configured to include a device driver and an interface for communicating with the DSD 100. The interface is configured to at least permit the exchange of data between the DSD 100 and the host computer system 130. In some embodiments, the interface also supplies the DSD 100 with power. The data and power interface operates over data port 106, which may be implemented as, for example, some form of USB port (e.g., USB-A, USB-8, USB-C, mini-USB, micro-USB, etc.), a Thunderbolt port, a Power over Ethernet (PoE) port, or a similar port.

In some examples, the host computer system 130 is a mobile computing device, such as a smart phone or tablet. In other embodiments, the host computer system 130 may include a device of a computer system environment, such as a server or workstation computing device. The host computer system 130 includes at least one device with at least one processor configured to perform the execution of sequences of machine instructions, and may have architectures consisting of a single or multiple processing cores such as, for example, a system having a 32- or 64-bit Advanced RISC Machine (ARM) architecture (e.g., ARMvx) for a mobile device.

In some embodiments, the DSD 100 includes one or more security components 107 configured to secure data passing through the data path 104. In one example, the security components 107 include a cryptography engine configured to receive, interpret and execute commands received from host computer system 130 according to a predetermined command set, such as for example the standard Advanced Technology Attachment (ATA) or serial ATA (SATA) and/or ATA Packet Interface (ATAPI) command set, which is available from Technical Committee T13 noting that identical functionalities can be implemented within Trusted Computing Group (TCG) Opal, Small Computer System Interface (SCSI) and other proprietary architectures.

The cryptography engine and other security components 107 are connected between the data port 106 and the storage medium 108 and is configured to use a cryptographic key to encrypt user content data 109 to be stored on the storage medium 108, and to decrypt the encrypted user content data 109 stored on the storage medium 108 in response to a request from the host computer system 130. That is, the storage controller 110 issues commands to the data path components to cause the cryptography engine to control a cryptographic state of the user content data 109 (i.e., encrypted or plain). For example, the controller 110 may provide a key to the data port 106, which the data port 106 then forwards to the cryptography engine via a SECURITY SET PASSWORD command of the ATA SECURITY feature set. In other embodiments, the DSD 100 is configured without security components 107, such that storage medium 108 is connected directly to the data port 106 via bus 120.

The storage controller 110 is configured to control the storage and retrieval of user data 109 to and from the storage medium 108. Controller 110 receives, via the data path 104, one or more commands from the host system 130, comprising commands to read user data from the storage medium 108; and write data to the storage medium 108, including erasing user data from the storage medium 108 or otherwise updating stored user data in the storage medium 108. These are referred to collectively as data access commands, as send by an application executing on the host computer system 130 to the storage controller 110 via the data port 106. In some configurations, the data access commands are sent from the data port 106 in the form of electrical signals transmitted through one or more data and control lines of a bus structure 120. In some embodiments, the bus 120 extends between the data port 106 and the storage medium 108, and is configured to be accessible by a processor 111 of the controller 110, as described below.

Controller 110 is configured to execute the data access commands to cause a corresponding transfer of data between the host computer system 130 and the storage medium 108 of the DSD 100. In response to the data transfer, the controller 110 generates performance data representing the performance of the DSD 100, including an efficiency ratio representing a relative utilization of an operational capability of the DSD 100 in conducting the data transfer.

The controller 110 includes a set of front end modules 105 and a set of back end modules 103 that are collectively configured to generate the performance data. Back end modules 103 interface with the storage medium 108, for example to determine the value of one or more operational parameters representing an input/output performance measurement characterizing the DSD 100. Front end modules 105 include components configured to interface device 100 with the host system 130, such as for example to control the transfer of data to and from the host computer system 130 via the data port 106. Front end modules 105 provide performance metric calculation functions to determine the efficiency ratio from the current operational parameter value and corresponding maximum capability.

Back end 103 and front 105 end modules communicate via an internal bus of the storage controller 110. Either module set 103, 105 is configured to utilize the bus 120 of data path 104 for example to send and receive data from data path 104 components, such as the data port 106 and storage medium 108, and/or to detect the transfer of data to or from the same. In the exemplary DSD depicted in FIG. 1, the controller 110 is separated from the data path 104 to which control is exercised over. However, in other embodiments, one or more components of the storage controller 110 may be included in the data path 104, such that the exchange of control signals and data between the module sets 103, 105 and the data path 104 components occurs via internal connections.

Front end module set 105 of the controller 110 is configured transmit the generated performance metric data to a display system 140 to visually indicate the performance metric values, including the efficiency ratio value. The display system 140 includes one or more display components 142 configured to provide the user 101 with a visual indication of the determined performance values of the DSD 100. For example, the display components 142 may include: a set of display indicators 144; and a display panel 143 configured to render the display indicators 144. The display system 140 also includes a display control circuit 141 configured to interface with the controller 110 and drive the display components 142 (i.e., the indicators 144, either directly or indirectly via the panel 143) in response to one or more display control signals.

In the described examples, one or more display indicators 144 are rendered on a display panel 143, such as a LED, LCD, OLED or similar screen, of the DSD 100. The display panel 143 may be integrated, at least partially, into a housing 116 or enclosure of the DSD 100. The enclosure 116 is configured to physically house the internal components of the device 100. The enclosure 116 is formed from a rigid, or semi-rigid, material with particular properties (e.g., electrical resistance and impact strength) suited to protecting the internal components of device 100. For example, the material of the enclosure 116 may include a polycarbonate (PC), an acrylonitrile butadiene styrene (ABS), an acrylic, a thermoplastic polyester, a metal, or a combination of any of these.

In some examples, the data storage device 100 includes one or more input components 102 configured to accept an input from the user 101. For example, the input components 102 may include a set of buttons, a keypad, and/or a similar arrangement of mechanical components that collectively enable the user 101 to specify functionality of the device 100.

Device Efficiency from Operational Parameter Values

Figure 2A:
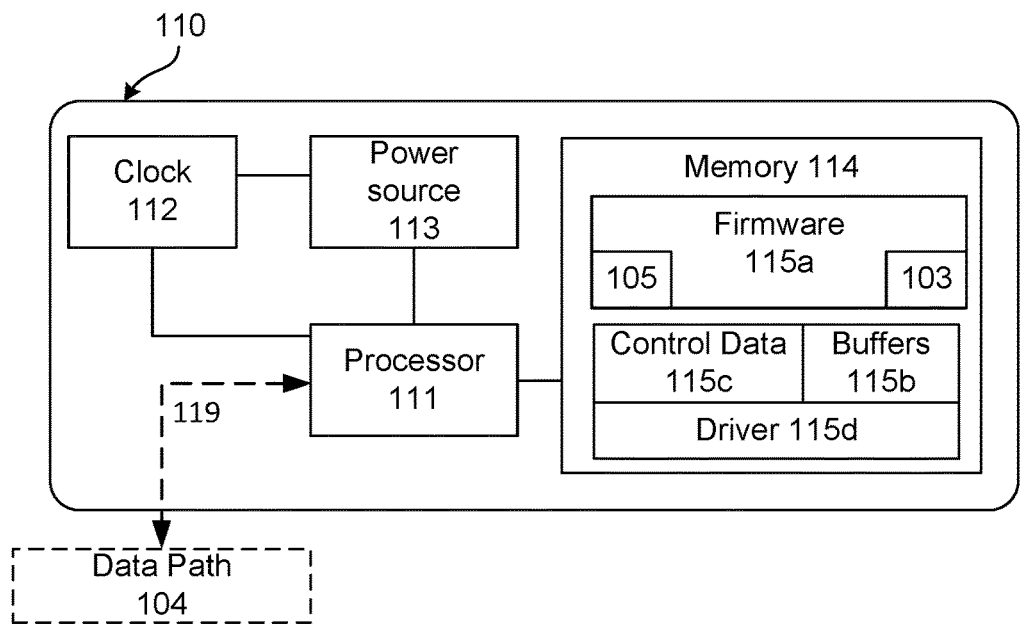
FIG. 2a illustrates a first block diagram of an access controller of the example DSD in accordance with some embodiments.

FIG. 2a illustrates an exemplary embodiment of the storage controller 110 which includes: a processor 111; a clock 112 in communication with the processor 111; a memory system 114 configured to exchange data with the processor 111 and having: a firmware 115a, configured to implement at least back end 103 and front end 105 module sets; one or more data buffers 115b; control data 115c; and one or more drivers 115d for facilitating the visual indication functionality described herein. The firmware 115a modules, control data 115c, and/or drivers 115d may be stored in a separately partitioned area of memory system 114, or in one or more dedicated hardware modules, such as caches, registers, or a combination of these.

Controller 110 includes a power source 113 (e.g., an internal battery) configured to power, at least, the processor 111 and the clock 112. The processor 111 is configured to execute program code stored within the memory system 114 to issue commands for controlling the operation of the DSD 100. Processor 111 is configured to receive data from data path 104, via flow 119, and from input components 102 (not shown in FIG. 2a). For example, processor 111 receives data representing a request by host computer system 130 to perform a read command on the user data 109 of the storage medium 108. In response to a decision by the controller 110 to execute the read command, the processor 111 generates and transmits data access control signals to cause the requested user data 109 to be placed on the data bus for transfer to the host (via data port 106).

In the described examples, buffers 115b refers to a storage portion of the memory system 114 that includes at least a read buffer and a write buffer, each configured to temporarily store data placed on the bus for respectively reading from and writing to the storage medium 108. The control data 115c is stored in a non-volatile storage portion of the memory system 114. The control data 115c comprises device specific data, including at least a unique identifier of the DSD 100, referred to as the device identity key (IDK), and a set of configuration values specifying the performance indication configuration of the DSD 100 (e.g., a selected operational parameter to determine the efficiency ratio, such as data throughput or IOPS).

Driver 115d defines a set of driver functions that are executable by the processor 111 in order to generate display control signals, in response to input parameters, such as the performance data values, for control of the display system 140. In some embodiments, the driver 115d and/or the control data 115c are part of the firmware 115a. The functions provided by the driver 115d are specific to the type and configuration of the display components 142, and/or the corresponding display panel 143, of the display system 140. For example, the driver 115d may include an LED driver, a LCD panel driver, or a similar component according to one or more of the various possible configurations of the display system 140.

The processor 111 is configured to execute the routines and functions of the modules of firmware 115a, including the front end 105 and back end 103 modules, to generate the performance data, including an efficiency ratio value. Processor 111 transmits the performance data, as generated by the firmware modules 103, 105, and the corresponding display control signals, as generated by the driver 115d, to the display control circuit 141 of the display system 140. In some embodiments, the processor 111 generates device control signals to regulate other functions of the DSD 100, such as for example to enable or disable data transmission through the data path 104, and/or to direct the encryption or decryption of the user content data 109 by security components 107 of the device 100.

The display control circuit 141 is display component specific, and is configured to interpret the signal generated by the corresponding driver 115d to drive the display components 142 to visually represent the performance data. For example, for LED indicators 144, the display control circuit 141 may include an LED control switch that translates the display control signal into individual LED control signals for operating each of the RGB sub-LEDs ("LED elements" of the indicator) of the corresponding panel 143 (as generated by a color driver 115d).

Figure 2B:
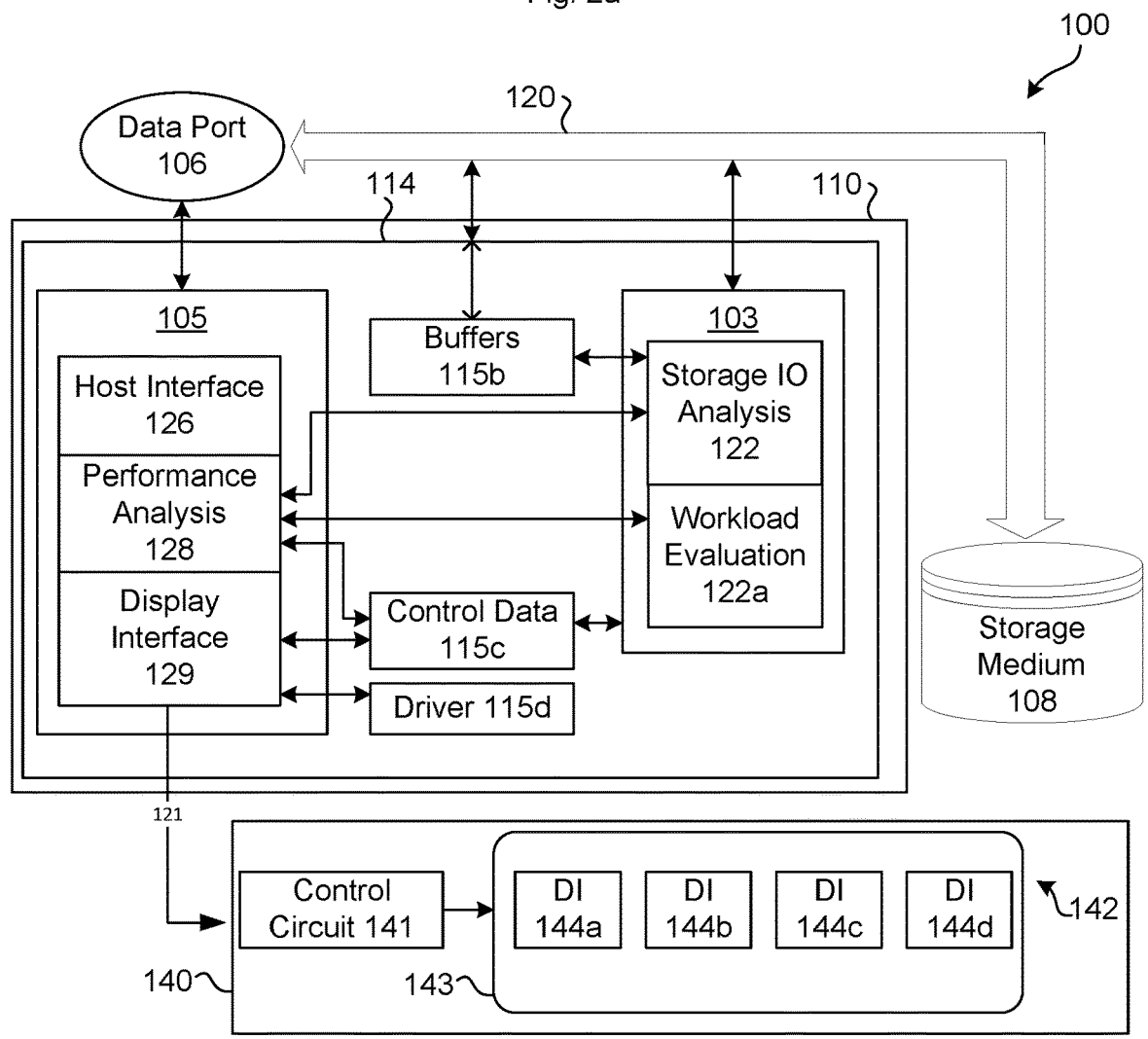
FIG. 2b illustrates a block diagram of a memory system of the access controller of the example DSD in accordance with some embodiments.

FIG. 2b illustrates an exemplary implementation of memory system 114, and a corresponding display system 140, for the generation and display of the performance data of the DSD 100. Controller 110 is connected to the data and control lines of the bus 120 to enable the modules 103, 105 of the controller 110 to detect, monitor, and facilitate data transfers between the data port 106 and the storage medium 108 via the bus 120.

In the described embodiments, back end modules 103 are configured to evaluate the performance of the DSD 100 in conducting a data transfer by determining a current value of an operational parameter (denoted as $P_{actual}$). The operational parameter is a data IO rate type parameter including: a data throughput value of the data transfer; and an input/output operations per second (IOPS) value of the data transfer.

IOPS measures the IO operation transfer rate of the DSD 100, or the number of transactions or operations that can occur in a given unit of time (e.g., seconds). Data throughput (abbreviated as "TP") refers to the rate of raw data transferred to or from the storage medium 108. Data throughput is measured in MB/s. A data TP value may be representative of only the device read rate (i.e., a data read TP value), only the device write rate (i.e., a data write TP value), or the combined device read and write rate (i.e., a total data TP value).

In some examples, the controller back end 103 includes a storage IO analysis module 122. The storage IO analysis module 122 is in communication with read and write buffers 115b and the storage medium 108 and is configured to: receive an indication of the IO rate type operational parameter of the device 100 for which the efficiency ratio is calculated; and process the data transfer caused by the execution of the one or more commands to determine the current value of the IO rate type operational parameter.

In some embodiments, the controller 110 maintains, within the control data 115c, an indication of one or more IO rate operational parameters (i.e., data TP or IOPS) for which corresponding performance values are calculated. Particular IO rate type operational parameters may be used to measure the performance of the device 100 depending on the configuration of the internal storage medium 108 and/or the characteristics of the data access commands conducted by the device 100 (e.g., whether the commands are random or sequential).

For example, for a HDD and similar electromechanical storage mediums, the random IOPS numbers are primarily dependent upon the random seek time. However, for SSDs and similar solid state (e.g., NAND based) storage, the random IOPS numbers are primarily dependent upon the speed of the controller 110 and memory interface. In such implementations, IOPS measurements represent the ability of the DSD 100 to process a number of 4 KB fragments read or write commands per second. The 4 KB fragments are referred to as flash management units (FMUs). That is, if the device 100 is marketed with 200K write IOPS, then it can process 200K of 4 KB fragments (i.e., writing into the medium 108) in a second. Read IOPS are measured analogously for read commands. Accordingly, in such embodiments, IOPS is a measurement of random performance of the data storage device 100, since a 4 KB read or write command is realized as random data access command.

By contrast, in embodiments using a SSD storage medium 108, the data throughput IO rate operational parameter is typically used to measure sequential performance. The sequential IOPS value determined by the storage IO analysis module 122 typically indicates the maximum sustained bandwidth that the DSD 100 can process (particularly when using a large block size). In this case, the storage IO analysis module 122 may be configured to report the operations count as a data throughput value (i.e., by computing IOPS× BlockSize then converting the result to MB/s).

Determining Data Throughput (TP) and IOPS Values

The storage IO analysis module 122 is configured to determine data read and data write rates representing the raw read and write speed at a memory interface between the medium 108 and the data bus (not shown). In some embodiments, the storage IO analysis module determines a data throughput value of the data transfer by processing the input/output activity of one or more memory buffers of the device 100.

For example, controller 110 is configured to facilitate a data transfer between the host computer system 130 and the medium 108 of the DSD 100 by writing data to, reading data from, the respective buffers 115b. The contents of the buffers 115b is then emptied to the memory blocksets of medium 108 or to the bus. In one example implementation, the storage IO module 122 issues polling signals to the respective read and write buffers 115b to determine buffer capacity, and therefore the rate at which data is exchanged between the bus lines and the buffers. The storage IO analysis module 122 processes the respective IO data rates (i.e., the data read and/or write throughputs) measured at buffers 115b to determine corresponding data read and write rates at the memory interface to medium 108.

In some configurations, the storage IO analysis module 122 combines the values of the raw data read rate and the raw data write rate to generate the current operational performance value ($P_{actual}$) as the total data throughput value. In other embodiments, the storage IO analysis module 122 is configured to maintain separate read and write data transfer rate values, thereby enabling the determination of separate efficiency ratio values specific to the read or write performance (as described herein below).

The storage IO analysis module 122 is also configured to measure a number of read and/or write operations associated with the data transfer thereby obtaining an indication of the IO transaction rate (i.e., the IOPS value). In the described implementations, the storage IO analysis module 122 is configured to measure the random data access workload of the DSD 100 by generating one or more of the following IOPS measurements with respect to an arbitrary data transfer conducted by the DSD 100: Random Read IOPS (i.e., the average number of random read I/O operations per second); and Random Write IOPS (i.e., the average number of random write I/O operations per second).

In some examples, the sequential data access workload of the DSD 100 is also measured by counting the Sequential Read (i.e., the average number of sequential read I/O operations per second), and Sequential Write (i.e., the average number of sequential write I/O operations per second) operations of the device 100. In some implementations, the storage IO analysis module 122 is configured to convert a count of the number of sequential operations to a data TP value representing sequential device performance, as described above.

The storage IO analysis module 122 is configured to generate an operational parameter IOPS value as the total IOPS (i.e., the total number of IO operations per second, over both data reads and data writes) and a data throughput value for types of random and sequential measurements respectively. In one embodiment, the storage IO analysis module 122 is configured to determine IO operations associated with the one or more executed commands in an "on-the-fly" mode (i.e., in real-time, or substantially real-time, as data corresponding to the commands is read from the bus). The internal clock 112 provides a timing signal enabling the IO analysis module 122 to determine the rate of data IO operations issued to the memory interface of the medium 108, thereby enabling the generation of the IOPS values by the IO analysis module 122.

In some configurations, the storage IO analysis module 122 includes a workload evaluation component 122a configured to characterize the data storage and retrieval operations associated with the data transfer as an access pattern (ap). The access pattern comprises one or more features including: a random/sequential access designation representing a degree of random or sequential nature of the data address requests to which the evaluation relates; a block size representing the data size of the transfer; and a read/write (r/w) operation ratio representing the relative proportion of read and write operations associated with the transfer.

Access patterns are generated to measure random and sequential workload performance by the workload evaluation component 122a. The workload evaluation component 122a determines whether the device 100 is conducting a sequential or random workload by processing the Logical Block Address (LBA) references for a set of data access operations ("commands") performed by the device 100 to determine the number of operations of the transfer that constitute a random or sequential access. For example, an operation is classified as sequential when its starting storage location (LBA) follows directly after the preceding operation (i.e., such that each new IO begins where the last one ended). In contrast, an IO operation is considered to be random when its starting LBA is not contiguous to the ending LBA of the preceding IO operation. The access designation for the commands may be determined as a binary value (i.e., 'Random' or 'Sequential') determined based on the processing of the designations of the individual operations (e.g., by taking the most common value).

The workload evaluation component 122a determines the block size (or "data length") of the corresponding read or write command. Exemplary block sizes of the data command may include small values (e.g. 1 KB, 4 KB, 8 KB) to large values (e.g. 128 KB to 1024 KB or more). Blocks are more efficiently stored in the blocksets of medium 108 when they are aligned with the memory cell boundary size so that, for example in the case of NAND cells, a 4 KB data block will fit exactly in a 4 KB NAND page block.

The workload evaluation component 122a is configured to determine, for each data access command executed by the controller, whether the command is a data read command or a data write command. The workload evaluation component 122a generates a numerical value representing the ratio of read to write commands ("r/w ratio") associated with the data transfer (e.g., 0.65 indicating that 65% of the commands are read-type data accesses, and the remaining 35% are write-type data accesses). For example, "RND 4 KB 65:35 R/W" describes a random IO access pattern consisting of: IO commands with data accesses that are 4 KB long (host command size) and in the proportion of 65% Reads to 35% Writes (r/w ratio). For a NAND based storage medium 108, the storage IO analysis module 122 determines a measured IOPS value for the random IO access pattern.

The workload evaluation component 122a transmits the access pattern feature values to the storage IO analysis module 122 on completion of processing the commands. The combination of the access type designation, the data block size and the r/w ratio enables the controller 110 to characterize the behaviour of the device 100 (e.g., performance according to the 4 kB aligned random I/O access workload). There is a relationship between data throughput and IOPS for a workload. For example, a 200K IOPS count at a 4 KB size equates to a 800 MB/s data rate. However, this is for a random data transfer. A sequential data transfer workload may result in a significantly increased throughput value, such as for example 2 GB/s. This is because the execution of sequential data access commands involves less control overhead. That is, the device 100 has a different capability for random IOPS performance and sequential throughput performance, and it is therefore misleading to assess the device 100 based on a comparison of the throughput values of the random and sequential benchmarks (e.g., 2 GB/s is greater than the 800 MB/s equivalent of 200K IOPS).

In some embodiments, the storage IO analysis module 122 is configured to selectively determine the use of an IOPS operational parameter or a data throughput operational parameter to assess device performance. For example, the determination of IO rate operational parameter may be made dynamically in response to determining that the set of commands is a random workload or a sequential workload respectively. This is advantageous in that the performance measurements generated by the controller 110 enable an indication of the random and sequential workload performance of the device 100 with respective IOPS and data throughput IO operational parameters, and thereby provide an indication of the relative utilization of the device 100 based on a maximum capability of each respective parameter, as described below.

Determining the Maximum Capability

Performance analysis module 128 of the controller front end 105 is configured to receive the measured operational parameter values ($P_{actual}$) generated by the controller back end 103 and determine corresponding maximum parameter capabilities of the DSD 100. In one embodiment, the performance analysis module 128 determines the maximum capability of an IO rate type operational parameter based on one or more properties of the DSD 100.

For example, to determine an efficiency ratio from a measured data throughput performance value $P_{actual}$, the performance analysis module 128 may retrieve a maximum data throughput value $P_{max}$ from a host interface 126. The host interface 126 is configured to control and report IO rates of data transferred from the host computer system 130 to the DSD 100 according to the specification and protocol of the data port to host computer connection. For example, a host interface 126 supporting a data port 106 that connects via USB 4.0 has a maximum transfer rate of ~40 GB/s. The performance indication functionality described herein enables a differentiation between random workloads and sequential workloads of the DSD 100 by generating an IOPS indication as an alternative, or in addition to, the legacy data throughput (e.g., MB/s) measurements used to measure sequential workloads or to generally indicate device Quality of Service (QoS).

The performance analysis module 128 is configured to parse the feature values of the access pattern to characterize the data transfer. In some implementations, the performance analysis module 128 maps one or more feature values of the determined access pattern to a binary value via thresholding. For example, the numerical value of the read-write (r/w) operation ratio may be converted to a binary 'read' or 'write' type value (e.g., using a threshold value of 0.5) to categorize the data transfer as one of the same.

In other embodiments, the performance analysis module 128 determines the maximum IOPS capability value via a host workload profiling process. For example, the analysis module 128 may be configured to process the access pattern values determined by the controller back end 103 for the one or more commands to generate an estimate of a workload profile of the host computer system 130, as associated with the data transfer. In some embodiments, the performance analysis module 128 implements a pattern recognizer, such as a Support Vector Machine (SVM) or Neural Network (NN), configured to maintain one or more models $\{\lambda_w\}$ representing respective workload profiles w of the host computer system 130. The workload models are trained based on a sequence of access patterns generated in response to the host computer system 130 issuing commands to the DSD 100 while operating in a known mode.

In this configuration, access patterns generated by the controller back end 103 of the DSD 100 are assumed to be a result of a notional IO workload profile of the host computer system 130. For example, a host computer system 130 may have a "boot-startup" workload profile corresponding to boot and operating system (OS) startup operations as characterized by initial access patterns with a small block size, and random read/write (RW) commands, followed by a shift to access patterns with a predominantly sequential read (R) as software modules load. A "mixed application" workload profile of the host computer system 130 may occur during the execution, by the host computer system 130, of one or more application programs that interact with various OS programs executing in the background.

The recognizer of the performance analysis module 128 is configured to generate and/or maintain model data representing workload models corresponding to the host operation profiles (e.g., $\lambda_{boot}$, $\lambda_{mixed}$, etc.). In some embodiments, the user 101 may configure the DSD 100 to generate workload model data representing custom host profiles such as, for example, by issuing data access commands to the DSD 100 while the host computer system 130 is in the desired operational mode. The performance analysis module 128 receives a sequence of various access patterns generated by the storage IO analysis module 122 and trains a corresponding model A for the operating mode of the host computer system 130. In other embodiments, the DSD 100 may be programmed with a set of pre-specified workload profile models at the time of manufacture, such that the device 100 does not require further training by the user 101.

To determine the maximum capability of an IO rate parameter, the recognizer evaluates the access pattern data generated in response to the one or more data access commands issued by the host computer system 130 (i.e., by the controller back end 103). For example, in some embodiments a scoring approach is implemented to identify an estimated host workload profile, from N candidate profiles, by calculating individual model scores $s(ap|\lambda_1) \ldots s(ap|\lambda_N)$ as values of the recognizer output scoring function s over a sequence of access patterns $ap=\{ap_{t_1} \ldots ap_{t_M}\}$ generated at respective times $t_1 \ldots t_M$. In response to determining the estimated host workload profile $\tilde{\lambda}$, the performance analysis module 128 determines a corresponding maximum capability of one or more IO rate operational parameters based on pre-specified capability values associated with $\tilde{\lambda}$ (e.g., as stored in the control data 115*c*).

For example, workload profile model $\lambda_{game}$ may represent a gaming mode of a host. The recognizer may determine the gaming mode model as the estimated workload model (i.e., $\tilde{\lambda}=\lambda_{game}$) in response to a series of access patterns ap= (random 4 KB 95:5 R/W) as generated by the storage IO analysis module 122 from data access commands issued by the host computer system 130. Performance analysis module 128 is configured to retrieve a maximum IOPS value corresponding to workload profile model $\lambda_{game}$, for example by performing a table lookup operation on control data 115*c*.

In some embodiments, the recognizer of the performance analysis module 128 is configured to recognize the occurrence of one or more special access patterns, and to identify a corresponding maximum capability of one or more IO rate operational parameters directly from pre-specified control data (i.e., without performing recognition against host profile models A). For example, the recognizer may be configured to detect a monotonic access pattern, such as an On-line Transaction Processing (OLTP) pattern (random 8 KB 65:35 R/W) or a Video-on-Demand (VOD) pattern (sequential 128 KB 90:10 R/W) and retrieve an appropriate IOPS value (e.g., from control data 115*c*).

Calculating the ER

Following the determination of the maximum capability value for the operational parameter (e.g., TP or IOPS in the case of an IO rate parameter), the performance analysis module 128 determines the efficiency ratio ER as $ER=P_{actual}/P_{max}$. As the maximum capability and the actual value of either the data TP or the IOPS IO rate parameter is calculated dynamically in response to the commands executed by the controller 110, the efficiency ratio ER represents a relative utilization of the IO transfer rate capability of the device 100.

In the described embodiments, the performance analysis module 128 is configured to maintain the ER value as a floating point numerical value. An ER value of 1.0 represents full utilization of the IO capability of the DSD 100 in conducting the data transfer. In accordance with the configuration above, the user 101 may interpret this to mean that the speed at which the device is transferring data to and from the internal storage medium 108 matches the host interface speed (i.e., the maximum rate that data can be transferred through the data port 106). Therefore, in this case, the IO rate capability of the device 100 is fully utilized. In another instance, the ER value may be below 1.0, for example in response to the rate of data transfer at the device memory interface being below the maximum host interface speed. A user 101 may interpret this to mean that there is some unused IO transfer capability of the device 100 during the data transfer.

In some embodiments, the performance analysis module 128 is configured to generate additional values of the performance data including: an availability value (AV) representing an un-utilized portion of the operational capability of the DSD 100. In one form, the availability value is an availability ratio determined as one minus the ER value. With reference to the above example cases, an ER value of 1.0 corresponds to an AV ratio of 1−1.0=0 since the DSD 100 is operationally fully utilized. However, an ER value of 0.75 corresponds to an AV ratio of 1.0−0.75=0.25 which reflects that 25% of the operational capability of the DSD 100 is un-utilized by the data transfer.

In other embodiments, the availability value is determined as a difference between the current value of the operational parameter and the maximum capability of the operational parameter (i.e., as $AV=P_{max}-P_{actual}$). For example, the differential AV value associated with a 35 GB/s transfer to/from medium 108 for a 40 GB/s rated host interface is AV=40−35=5 GB/s.

Signaling the Display System

Referring to FIG. 2*b*, the controller front end 105 also includes a display interface 129 configured to communicate with the display system 140. Display interface 129 receives performance data, including one or more ER values, and AV values if applicable, as generated by the performance analysis module 128. The display interface 129 includes one or more functions for transmitting display control signals to the display system 140 thereby instructing the display of the corresponding performance data values by the display system 140.

In one embodiment, the display interface 129 is configured to provide the display control signals to the display system 140 via a set of connection lines 121 which are separate from the lines of the bus 120. Display interface 129 transmits one or more control signals via lines 121 indicating the values of the performance data, as currently determined by the performance analysis module 128.

Display interface 129 is configured to communicate with the display driver 115*d* of the controller 110 to generate the one or more display control signals for the control of display components 142 of the display system 140. The display interface 129 executes a micro-control operation, or a function call to an API of the display system 140, with the performance data values. In response, the processor 111 generates the control signals by invoking driver 115*d*. In the described embodiments, the display driver 115*d* is configured to generate display control signals to cause the display panel 143 to display the performance values on corresponding individual display indicators (DIs) 144*a*-144*d*. Any other arbitrary number, type, and arrangement of display indicators, panels, and components may be implemented in other embodiments.

In the described embodiments, display indicators 144*a*-144*d* are rendered on a display panel 143, such as a LED, LCD, OLED or similar panel, and have a pre-specified visual layout for the indicating one or more of the performance values (referred to as "performance indicators"). Display driver 115*d* is an LED driver configured to control one or more display properties of each display component 142 (i.e., panel 143 and/or indicators 144*a*-144*d*).

In some embodiments, the LED driver 115*d* is configured to retrieve display data from the memory system 114 (e.g., from within the control data 115*c*). The display data may include display configuration information representing one or more characteristics of the display components 142. For example, the display data may include a component map describing the characteristics, such as pixel co-ordinate positions and corresponding color values, of one or more background elements of a display indicator 144*a*-*d* (e.g., a graphical progress marker, or bar outline, or meter outline, etc.) to be rendered on the respective panel 143.

The display interface 129 provides the display control signals to the display system 140 via the connection lines 121. The display control circuit 141 is configured to receive, from the controller 110, the performance data and the display control signals. The display control circuit 141 processes the performance data and the display control signals to cause at least one display indicator 144*a*-*d* to display at least the efficiency ratio ER of the performance data.

Visual Performance Indicators

Figure 3A:
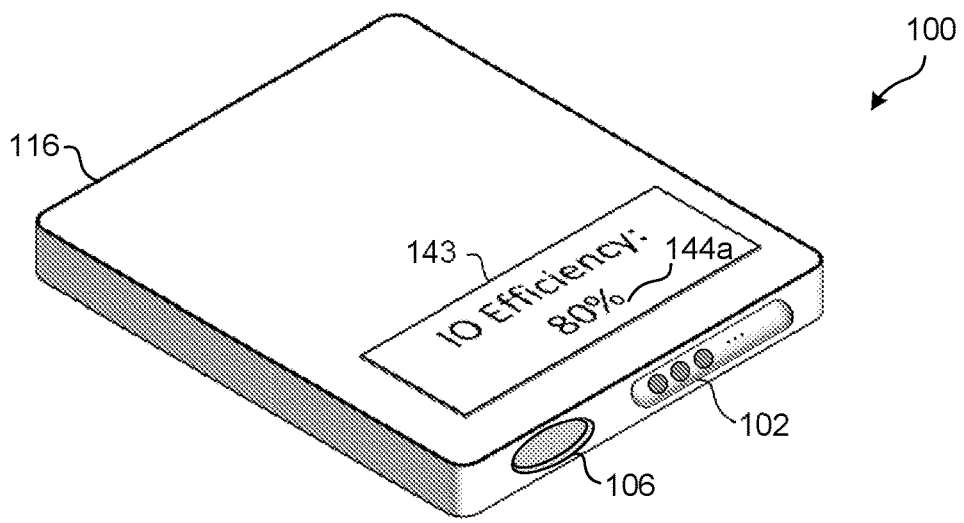
FIG. 3a illustrates a perspective view of the DSD having a first set of exemplary display components for displaying performance data values, in accordance with some embodiments.
Figure 3B:
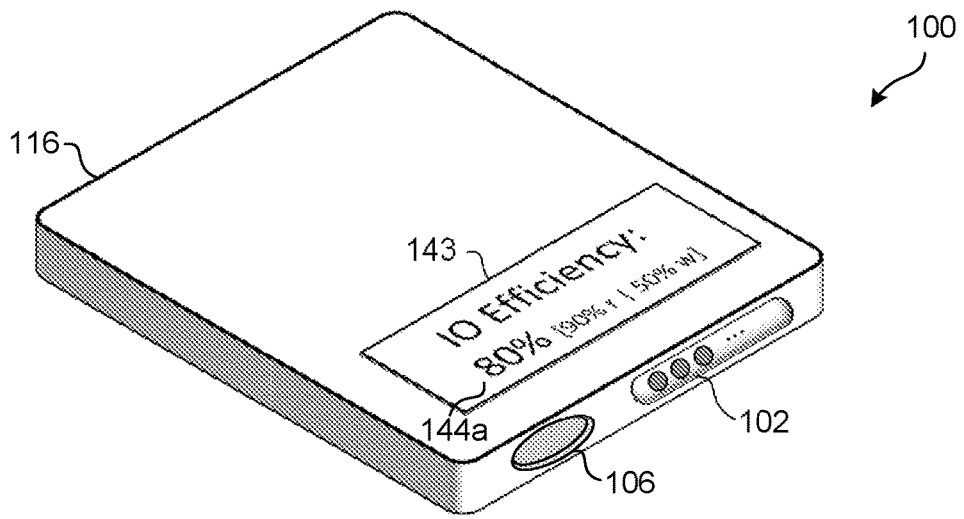
FIG. 3b illustrates a perspective view of the DSD having a second set of exemplary display components for displaying performance data values, in accordance with some embodiments.
Figure 3C:
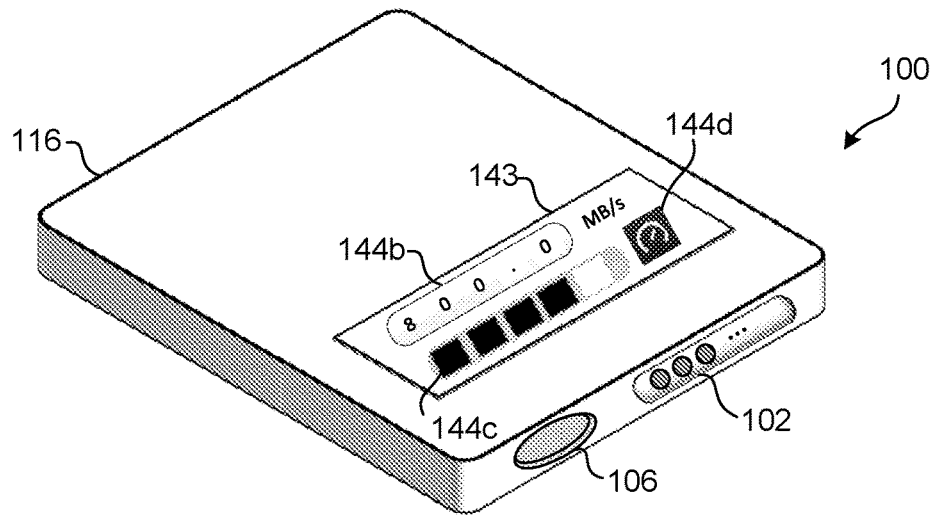
FIG. 3c illustrates a perspective view of the DSD having a third set of exemplary display components for displaying performance data values, in accordance with some embodiments.

FIGS. 3*a*, 3*b*, and 3*c* illustrate examples of particular display components 142 configured to provide a visual indication of performance values of the DSD 100. In the illustrated embodiments, DSD 100 is an external storage drive in the form of a direct access storage (DAS) device configured to be removably connected to, and easily disconnected from, the host computer system 130 in an ad-hoc manner. The data port 106 is configured to accept a USB connector for connecting DSD 100 to the host computer system 130. The enclosure 116 houses a storage medium 108 in the form of an SSD for storing data 109. Input components 102 comprise a button set including, for example, individual button elements to control the performance indication functionality of the DSD 100.

In the illustrated examples, the display components 142 include one or more LED indicators 144*a*-144*d* each configured to display a performance value, such as the ER value. As illustrated in FIGS. 3*a* and 3*b*, in one embodiment the DSD 100 includes a LED display panel 143 incorporated into, or at least partially integrated with, a top surface of the enclosure 116. The LED display panel 143 is configured to render an indicator 144*a* in the form of a text or graphic image or label. Display panel 143 is configured to display the indicator 144*a* in a pre-specified and controlled manner by applying control signals to the one or more panel sub-components to cause the sub-components to emit a particular color at a given intensity and location on the panel 143.

For example, in some embodiments the display panel 143 is a flat-panel display such as a LCD, LED or OLED screen configured to display an arbitrary image, text label, or symbol. For example, display 143 may be implemented as an active-matrix organic light-emitting diode (AMOLED) panel, or as an in-plane switching (IPS) LCD panel that includes a liquid crystal layer set between a series of polarizing color filters used to generate red, green and blue subpixels. The liquid crystals are oriented in a plane parallel to the glass substrates and an electrical field is applied through opposite electrodes on the same glass substrate, so that the liquid crystals can be reoriented (switched) essentially in the same plane, although fringe fields inhibit a homogeneous reorientation. The color of each pixel in the display panel 143 is set by two transistors on the application of a control voltage signal.

Display indicators 144*a*-*d* are configured to include: a base element such as a portion of background text, images, graphics or other visual material that remains constant; and a performance representation element. For example, FIG. 3*a* illustrates exemplary display components 142 including a textual indicator 144*a* configured to display a single relative numerical value of the ER. Textual indicator 144*a* includes a base element comprising the "10 Efficiency:" text, and a percentage representation of the ER value (e.g., "80%"). Textual indicator 114*a* may be a color, greyscale or two-tone (i.e., black and white) label as rendered on panel 143. In other examples, the panel 143 may be configured to display a graphic or image associated with the representation of the ER value. The image or graphic may be pre-specified and determined by a mapping function of the firmware 115*a* from input of the numerical value of the performance value(s).

In some examples, the display components 142 are configured to display multiple values of the performance data via a single indicator 144. FIG. 3*b* illustrates an alternative configuration of textual indicator 144*a* in which separate efficiency ratio values ER, and $ER_r$ and $ER_w$ are displayed by the performance representation element (i.e., "80%" representing the efficiency of the total data TP, and "90%" and "50%" respectively representing the efficiency of the read data TP and write data TP).

In some embodiments, the display components 142 include two or more display indicators 144 configured to display a combination of relative and absolute performance values. FIG. 3*c* illustrates exemplary display components 142 including a base LED panel 143 configured to render separate LED indicator elements 144*b*-*d*. The LED indicator elements 144*b*-*d* include a first indicator 144*b* configured as an absolute performance indicator, and a second indicator 144*c* configured as a relative performance indicator. The absolute performance indicator 144*b* is of a form that displays a representation of the current operational parameter value, such as for example a numerical, graphical or combined representation of the total data TP (e.g., "800.0 MB/s" as depicted in FIG. 3c).

The relative performance indicator 144c is of a form that displays a representation of the efficiency ratio (ER) value. For example, indicator 144c of FIG. 3c is a weighted box type display indicator with a base element comprising an outline of five box markers, and a performance representation element comprising one or more optical properties (e.g., color, transparency, etc.) of the area within the boxes. In the depicted configuration of indicator 144c, the ER value is represented as a proportion of consecutively colored boxes vs. non-colored boxes (e.g., providing a visual representation for a ratio of 4/5 for an ER value of 0.8). The example of FIG. 3c also includes a third indicator 144d configured as a second relative performance indicator. Indicator 144d is in the form of a speed meter, with a base element providing a meter outline, and a performance representation element extending over the interior of the meter gauge (i.e., such that a change in an optical property, such as color, within the interior provides an indication of the ER value).

The display control circuit 141 is configured to process the display control signals generated by the display interface 129 to drive the operation of the absolute and relative performance indicators 144b, 144c, 144d such that the respective displays of the indicators 144b, 144c, 144d are synchronized in real-time. In one implementation, the display control circuit 141 extracts, from the display control signals, one or more voltage values to apply to the respective indicators 144b, 144c to cause a change in the displayed performance representation element (e.g., numerals for 144b, and box colors for 144c) to indicate an updated value of the current operational parameter value and the ER value respectively.

To achieve a synchronous update of the performance data representation on all the indicators 144b, 144c, 144d, the display control circuit 141 invokes corresponding display operations of the indicators 144b, 144c, 144d based on the display properties of the indicators 144b, 144c, 144d. For example, the display interface 129 may obtain indicator response time data from the control data 115c, and subsequently generate display control signals that instruct the display control circuit 141 to invoke the display operations of the indicators with an indicator specific delay. The display interface 129 calculates the delay value for each indicator to accommodate for the variation in response time between the indicators 144b, 144c, 144d. For example, absolute indicator 144b may have a longer response time compared to relative indicator 144c. As a result, display control circuit 141 may prioritize invoking the display operations of the absolute indicator prior to those of the relative indicator 144c, such that the visual change in representation of both indicators is approximately simultaneous.

In some embodiments, the display components 142 may solely comprise of one or more display indicators 144 configured to represent performance values without a base panel 143. In an alternative embodiment of the DSD 100 shown in FIG. 3c one or more of the display indicators 144b-d may be self-sufficient LED elements that are independently integrated with, or formed directly on, the housing 116. For example, the relative indicator 144c may be implemented on, or within, a surface of housing 116 as one or more electrochromic layers configured to change the color displayed on the surface in the respective regions of the boxes (e.g., in response to a voltage applied to the layer).

Indicating Device Performance

Figure 4:
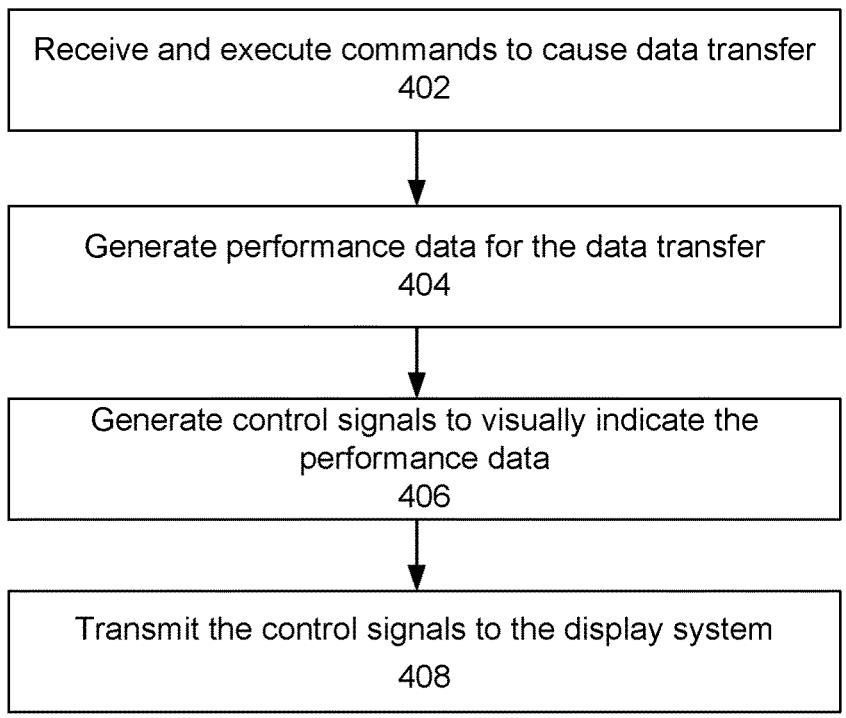
FIG. 4 illustrates a flow diagram of a process for indicating the performance of the DSD in conducting a data transfer, in accordance with some embodiments.

FIG. 4 illustrates a method 400 for indicating the performance of DSD 100 in conducting a data transfer between the storage medium 108 and the host computer system 130 according to the described embodiments. The steps of the method 400 are implemented at least in part by the DSD 100 or its components, such as the controller 110. At step 402, the controller 110 receives a request from the host computer system 130 to perform one or more commands to access user data 109 of the storage medium 108 (referred to as data access commands). For example, a data access command may involve a read operation to retrieve data 109 from the medium 108, or a write operation to store user data provided in the request to the medium 108.

The controller 110 processes the received data access commands and, in response to executing one or more of the commands, initiates a transfer of data through the data path 104. For example, the controller 110 executes a data read operation by locating a requested portion of user data 109 within the memory space of the storage medium 108, and instructing the storage medium 108, via a memory interface module, to send the data to the data port 106 via the bus 120 of the data path 104.

The execution of data access commands by the controller 110 thereby causes a transfer of data (i.e., though the bus 120 between the memory interface and the host interface 126 of the data port 106). Associated with the data transfer are a number of other effects such as: an execution, by the controller 110, of a number of IO operations such as read and/or write operations to the storage medium 108; a consumption of power by the controller 110 and other hardware components of the DSD 100 in performing the operations to achieve the data transfer; and a corresponding generation of thermal energy by the operation of one or more components of the DSD 100.

Figure 5:
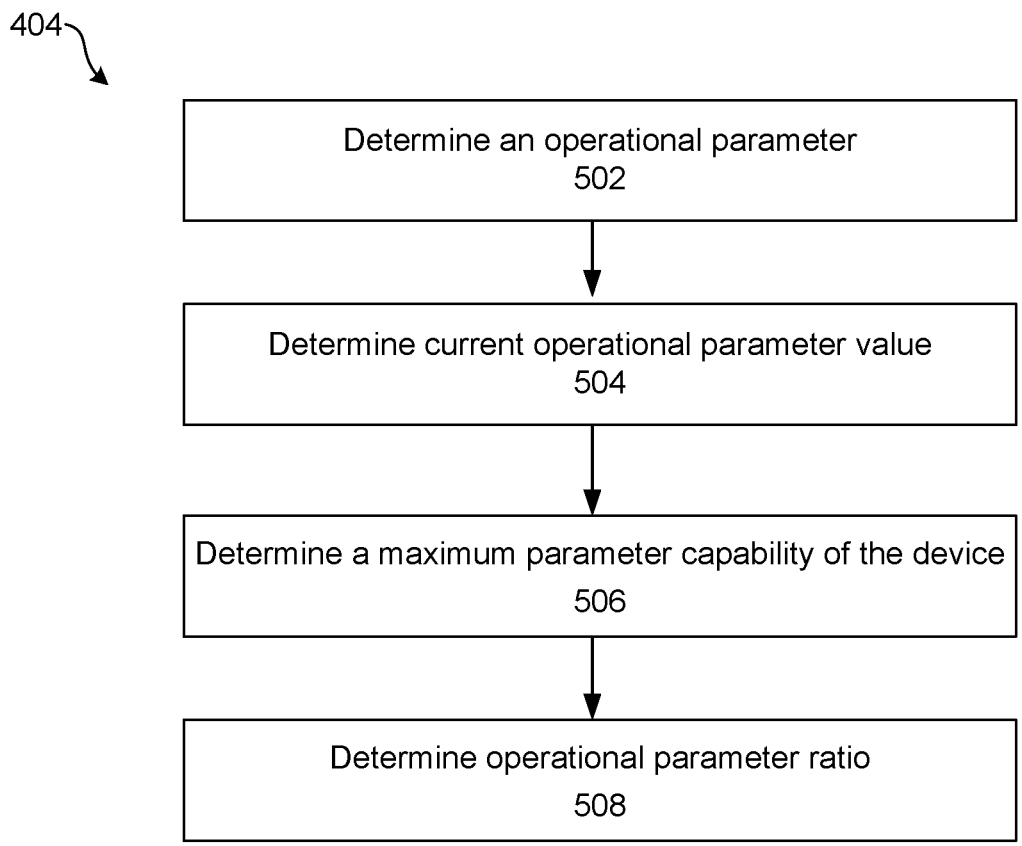
FIG. 5 illustrates a flow diagram of the generation of the performance data of the process of FIG. 4, in accordance with some embodiments.

At step 404, the controller 110 is configured to generate performance data including an efficiency ratio value representing a relative utilization of an operational capability of the DSD 100 in conducting the data transfer. FIG. 5 illustrates a process for generating the performance data in accordance with some embodiments. At step 502, the controller 110 determines the operational parameter used to calculate the device efficiency ratio ER. In the described embodiments, the operational parameter is selectively determined from one or more data IO rate type operational parameters, including the data TP or the IOPS of the DSD 100. In some embodiments, the user 101 may select and/or toggle the operational parameter used to determine the efficiency ratio, such as for example by actuating one or more of the input components 102. This enables the user 101 to exercise control over the performance evaluation functionality at a time of use of the DSD 100.

In other embodiments, the controller 110 is configured to selectively determine the operational parameter dynamically in response to one or more properties of the one or more data access commands. For example, the controller 100 may select between a data TP operational parameter and an IOPS operational parameter by determining whether the set of commands best represents a random workload or a sequential workload respectively.

At step 504, the controller 110 determines a value of the operational parameter as associated with the data transfer. Storage IO analysis module 122 determines an indication of the operational parameter, for example by retrieving an indication of the user selection from a variable in the control data 115c, or by dynamically processing the data access commands. The storage IO analysis module 122 invokes one or more IO rate parameter specific measurement functions to determine the current operational performance value ($P_{actual}$) by processing the data transfer and/or commands of the host 103. For example, in the case of a data TP parameter, the storage IO analysis module 122 processes the input/output activity of memory read and write buffers 115b to derive one or more data TP values for $P_{actual}$, as described above.

In the case of an IOPS parameter, the storage IO analysis module 122 determines the operational performance measure $P_{actual}$, as an IOPS value representing the IO transaction rate of the device 100. For example, the storage IO analysis module 122 may define a transaction window of duration $t_w$ extending over a time period in which the controller 110 is conducting the data transfer. The storage IO analysis module 122 is configured to generate one or more IOPS values (as described above) by detecting corresponding read and/or write operations and converting the total number of detected operations of a particular category (e.g., Random Read 4 KB) to an IO operation rate based on the duration $t_w$.

At step 506, the controller 110 determines the maximum operational parameter capability value $P_{max}$. The performance analysis module 128 receives the measured operational parameter data generated by the storage IO analysis module 122, including current IO rate parameter value(s) $P_{actual}$ and a corresponding access pattern ap (if applicable) to the performance analysis module 128 of the controller front end 105.

The performance analysis module 128 invokes one or more maximum capability determination functions to determine the $P_{max}$ value based on the operational parameter and a capability determination mode of the controller 110. The capability determination mode represents whether the maximum capability value $P_{max}$ is determined from the processing of: (i) one or more properties of the DSD 100 (i.e., a "hardware-based" mode); (ii) the access pattern of the data transfer (i.e., an "access-based" mode); or (iii) a combination of (i) and (ii) (i.e., a "combined" mode). The capability determination mode is represented by a value stored within the control data 115c. In some embodiments, the capability determination mode may be adjusted by the user 101 (e.g., by actuation of the input components 102).

In some examples, the performance analysis module 128 determines the maximum capability value $P_{max}$ as a maximum data TP value or a maximum total IOPS value of the DSD 100, such as for mode (i) above. For example, for the use of a data TP parameter the performance analysis module 128 queries the host interface 126 to obtain the host interface data rate (i.e., as a total data rate, a read data rate, or a write data rate), and sets the retrieved value to $P_{max}$.

Figure 6:
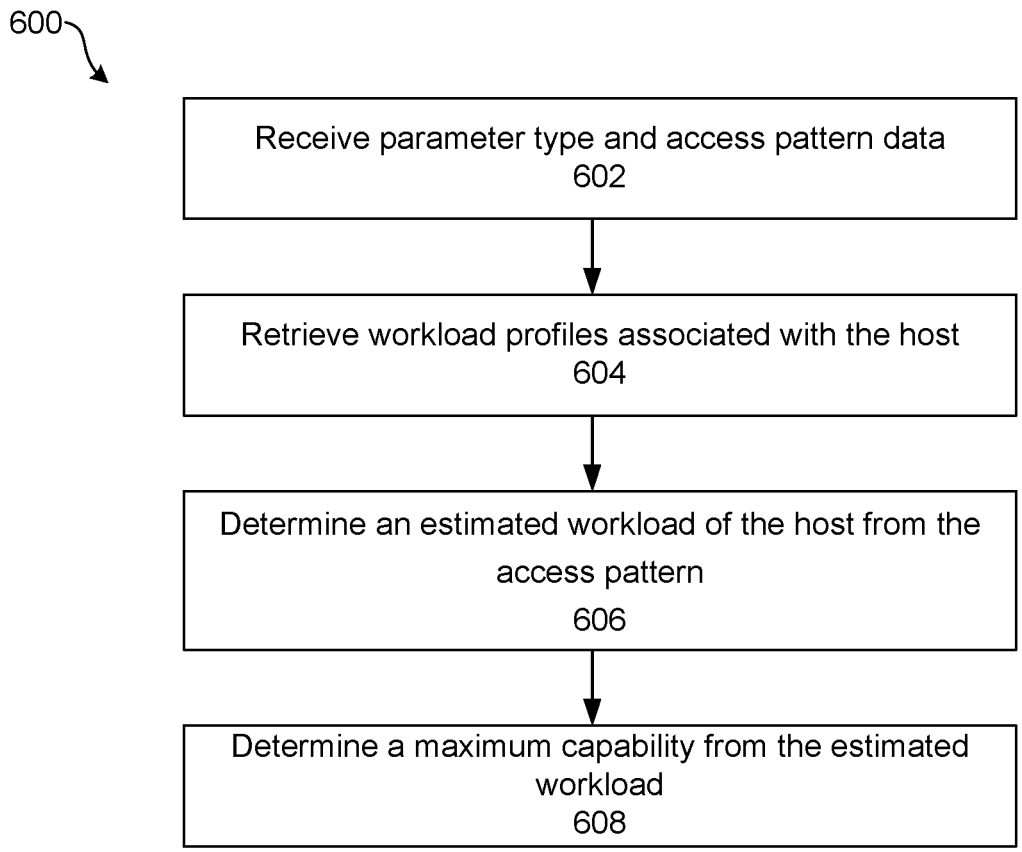
FIG. 6 illustrates a flow diagram of the generation of the maximum capability value for generating performance data of the process of FIG. 5, in accordance with some embodiments.

In some examples, the performance analysis module 128 determines the maximum capability value $P_{max}$ by processing the access pattern of the data transfer, such as for mode (ii) above. FIG. 6 illustrates a process 600 of the controller 110 for determining the maximum capability value $P_{max}$ via workload profile estimation. At step 602, the performance analysis module 128 receives an indication of the operational parameter type and a corresponding access pattern characterizing the storage and retrieval operations associated with the data transfer.

At step 604, the performance analysis module 128 retrieves a set of one or more workload profiles associated with the host computer system 130 for the DSD 100. For example, the workload profiles may be workload models $\{\lambda\}$ generated by the workload evaluation module 122a from one or more prior access patterns of corresponding prior data transfers between the host computer system 130 and the DSD 100. The workload models represent access pattern values associated with operational modes of the host computer system 130 during use of the DSD 100, as described above.

In some embodiments, the performance analysis module 128 retrieves the workload models $\{\lambda\}$ from the workload evaluation module 122a dynamically at the time of determination of the $P_{max}$ value. In other embodiments, the performance analysis module 128 retrieves the workload models $\{\lambda\}$ from a known location in the memory system 114, such as the control data 115c.

At step 606, the performance analysis module 128 processes the determined the access pattern ap to determine an estimated workload profile A of the host computer system 130. In one embodiment, the recognizer of the performance analysis module 128 matches the values of the access pattern ap against the set of workload profile models, and determines the highest scoring model as the estimate (e.g., via likelihood scoring, as described above).

At step 608, the performance analysis module 128 determines the $P_{max}$ value from the estimated workload profile (e.g., an estimated workload model A) of the host computer system 130. In some embodiments, the control data 115c includes a model-to-capability translation table $T_{MtC}$ providing a mapping of one or more workload profiles to corresponding maximum capability values, for particular operational parameters, for example in one embodiment as:

| Workload model | Workload description | Max capability of data TP | Max capability of IOPS |
| --- | --- | --- | --- |
| $\lambda_{game}$ | Gaming host workload | 500 MB/s | 1000 KIOPS |
| $\lambda_{surv}$ | Surveillance host workload | 100 MB/s | 100 KIOPS |

In some examples, the performance analysis module 128 is configured to conduct both hardware-based and access-based determinations of candidate maximum capability values and to select a maximum capability value $P_{max}$ from the candidates, such as for mode (iii) above. For example, the performance analysis module 128 may select a candidate maximum data TP value or a maximum total IOPS value of the DSD 100, as obtained by querying the host interface 126, over a candidate maximum capability value determined by conducting workload estimation in the case that the estimated workload profile (e.g., recognizer model $\tilde{\lambda}$) was obtained with a low confidence.

With reference to FIG. 5, following from the determination of the $P_{max}$ value, at step 508 the performance analysis module 128 determines the efficiency ratio as the ratio of the actual $P_{actual}$ and maximal $P_{max}$ capacity performance values as: $ER = P_{actual}/P_{max}$. The performance analysis module 128 generates performance data to encapsulate at least the determined ER value. In various embodiments, the performance analysis module 128 generates a single or multiple ER values representing a relative utilization of the total capability, or a particular sub-capability, of the device 100 in accordance with the operational parameter.

For example, in one embodiment the controller front end 105 may be configured to determine a single ER value representing the relative utilization of total data TP of the DSD 100. In this case, the performance data includes the determined ER value, and optionally one or more of: a corresponding availability value (AV); the determined current value of the total data TP ($P_{actual}$); and the determined corresponding maximum total data TP capability ($P_{max}$), as associated with the data transfer.

In another example, the controller front end 105 may be configured to determine separate efficiency ratio values ER, and ER, and ER, representing the relative utilization of total data TP, the read only data TP, and the write only data TP, of the DSD 100. In this case, the performance data generated by the performance analysis module 128 includes the ER, and ER, and ER, values represented as an array, and optionally one or more of a corresponding array of availability values (AV, $AV_r$, $AV_w$); the determined current values of the total data TP, the read data TP, and the write data TP; and the determined corresponding maximum total data TP capability, read data TP capability, and write data TP capability, as associated with the data transfer.

With reference to FIG. 4, at step 406 the controller 110 generates one or more control signals to cause the display system 140 to visually indicate at least the efficiency ratio (ER) value of the performance data. The performance analysis module 128 provides the values of the performance data to the display interface 129. For example, the performance analysis module 128 invokes one or more display generation functions of an API of the display interface 129 to provide the performance data to the interface 129 as one or more function arguments. The display interface 129 communicates with driver 115d to generate the one or more control signals enabling the display system 140 to control one or more of the display indicators 144 to display the performance data values.

Figure 7:
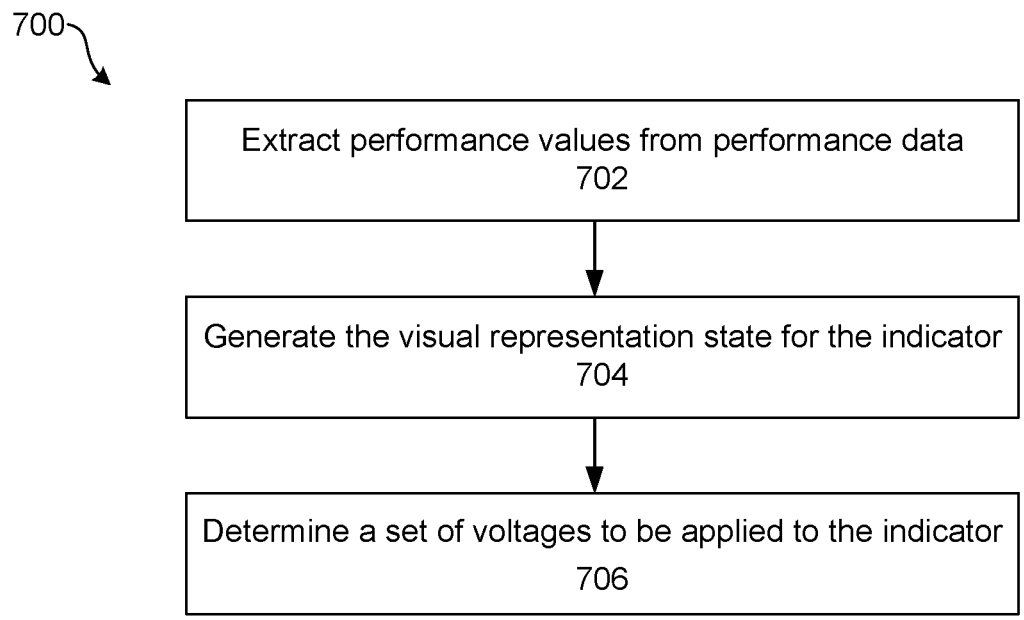
FIG. 7 illustrates a flow diagram of the generation of display control signals to display the performance data, in accordance with some embodiments.

The interface 129 is configured to generate the control signal(s) according to the configuration and/or type of display components 142 and control circuitry 141 of display system 140. FIG. 7 illustrates a process 700 performed by the controller 110 to generate display control signals to instruct the display system 140 to display performance data values, by: processing the performance data value(s), including for example the ER value; determining a visual representation state (e.g., a color, digit value, bar area, etc.) of one or more LED elements to indicate the performance data value(s), on a given display indicator 144a-d; and determining a corresponding set of voltages to be applied to the given display indicator 144a-d by the control circuit 141 to cause the display of the visual representation state on the LED elements.

For example, with reference to FIG. 3c weighted box indicator 144c includes five LED elements corresponding to the individual LEDs for each box. At step 702, the interface 129 generates control signals for indicator 144c by extracting the ER value from the performance data. At step 704, interface 129 generates the visual representation state for indicator 144c by mapping the floating point value of the ER (e.g., 0.8) to a corresponding number of LED elements that are wholly and/or partly illuminated, to display the ER value (e.g., an ER of 0.8 corresponds to the fraction 4/5, such that 4 boxes are wholly illuminated, and 0 boxes are partly illuminated).

In some embodiments, determining the visual representation state includes determining a color, an illumination mode (e.g., solid or flashing), or another display characteristic of the LED elements (i.e., each weighted box of indicator 144c). In the described embodiments, the controller 110 is configured to maintain an indicator specific mapping of particular display characteristics (e.g., colors) of each element (e.g., LEDs) used to display performance data values by the indicator. The mapping may be stored in the firmware 115a or as part of the control data 115c.

In one exemplary configuration, the control data 115c specifies a RGB color model representation of each possible color displayable by the LED elements of weighted box indicator 144c to visually represent the ER value. For example, in one implementation wholly and partly illuminated LED boxes of indicator 144c are represented by green and yellow colors respectively. For other indicators, the controller 110 may be configured to determine the visual representation state for the ER value by processing display data obtained from the memory 114, such as for example the component map (e.g., to determine the locations of LED elements to illuminate as corresponding to pixel co-ordinates on panel 143).

At step 706, the controller 110 determines a set of voltages to apply to the LED elements of the indicator to display the determined visual representation state. Processor 111 determines the voltage value by retrieving a subset of the control data 115c corresponding to the determined visual representation state of the indicator (e.g., weighted box indicator 144c) and by executing a routine of firmware 115a with the retrieved data. The control data and routine are specific to the display components 142, including the indicator 144c and supporting components (e.g., panel 143). In the above example, the controller 110 determines voltage values for the wholly illuminated box elements by invoking the firmware routine with the green color vector (0,255,0). The firmware routine returns one or more voltage values to apply to the LED elements of indicator 144c to affect a change in the displayed color.

The processor 111 is configured to generate the display control signal(s) by invoking driver 115b with the determined voltage values, and other data relevant to the control of the display indicator (e.g., indicator 144c, including each of the five box LED elements) as stored in firmware 115a.

Returning to FIG. 4, at step 408 the controller 110 transmits, via the interface 129, the display control signal(s) to the display control circuit 141 of display system 140. The function and configuration of the display control circuit 141 varies according to the display components 142 of the system 140. In the described examples, the display control circuit 141 includes one or more electronic components that are configured to process the received indicator control signal to: apply the determined voltage(s) one or more of the display components 142, such as the panel 143 and/or indicators 144a-d.

For example, display control circuit 141 directs the operation of the LEDs of indicator 144c by applying the set of voltages to the panel 143 to cause the LEDs to emit light of a particular color (e.g., green). In some implementations, the control circuit 141 ceases the application of the determined set of voltages to the display components after the display has been updated to reflect the performance value (e.g., for indicators with persistent display elements, such as electrochromic surfaces).

In some embodiments, the controller 110 is configured to transmit the generated performance data values to the host computer system 130 enabling the host computer system 130 to provide the user 101 with an indication of device performance via one or more display elements of the host computer system 130. For example, the display interface 129 may be configured to encapsulate the performance data values received from the performance analysis module 128 into a performance display message of a pre-specified form. The performance display message may be transmitted to the host computer system 130 via the bus 120 of the data path 104.

The host computer system 130 is configured to visually indicate the performance of the DSD 100, including at least the efficiency ratio, on a display component of the host computer system 130. For example, a host computer system 130 in the form of a personal computing device, such as a workstation or laptop, may be configured to execute a data storage device performance application that receives the performance display message and extracts the performance data value(s), including the ER value, by parsing the message fields according to the pre-specified form. The data storage device performance application displays the extracted the performance data values on one or more display panels, such as monitors and/or screens, connected to or integrated with the host system 130. The display of the performance values of device 100 by the host computer system 130 may occur as an alternative to, or in conjunction with, the display of the performance values provided by display system 140 of the DSD 100.

Such embodiments are advantageous in that the user 101 is provided with an indication of the performance of the DSD 100 that is delivered externally to the DSD 100 itself. For example, indications of the relative utilization of the device 100 by the host computer system 130 may still be provided to the user 101 even in cases where the DSD 100 is not visible during use (e.g., where the non-display and non-peripheral components of the host computer system 130, and the connected DSD 100, are located out of sight of the user 101).

In some embodiments, the relative utilization of the DSD 100 is represented as an efficiency ratio determined from an operational parameter other than an IO rate type operational parameter. In one example, the controller 110 is configured to generate an operational performance measurement from the current total power consumption of the DSD 100. For example, with reference to FIG. 1, the controller 110 may be configured to measure power consumption values for components of the DSD 100, including: the input components 102; the display system 140; the components of the data path 104, such as data port 106, security components 107, and storage medium 108; and the controller 110, such as front end modules 105 and back end modules 103.

The power consumption of each component of the DSD 100 may vary in response to the number and type of data access commands processed by the controller 110. The controller 110 may include a power utilization module (not shown) to determine the individual component power consumption values in real-time as the controller 110 processes the one or more data access commands received from the host computer system 130. For example, the power utilization module may generate the operational performance value ($P_{actual}$) by polling each component of the DSD 100 to determine a corresponding power consumption value, and aggregating the individual power consumption values to generate a total power usage value for the DSD 100 at the present time. The power utilization module may determine a maximum capability of the power utilization operational parameter $P_{max}$ as a pre-specified value, such as for example a maximum power load sustainable by the DSD 100, by retrieving a value stored in the control data 115c.

In response to receiving the actual and maximal power consumption values, the performance analysis module 128 is configured to determine the efficiency ratio ER value (i.e., as $ER=P_{actual}/P_{max}$) thereby generating a representation of the relative utilization of the DSD 100 as a power utilization ratio. The power utilization ratio is then displayed via the one or more display indicators 144 of the display system 140, for example using the techniques described herein above.

Some embodiments of the DSD 100 may be configured to calculate an efficiency ratio by measuring one or more other physical properties of the device 100 which have a defined relationship between the value of the property and the real-time state of the device 100 in processing data access commands. For example, controller 110 may be configured to measure thermal emission values of device components, such as by receiving thermal measurements (e.g., one or more thermal emission values representing the temperatures of one or more components of the DSD 100) from one or more thermal sensors deployed within the DSD 100, and to generate and display an ER value from the thermal measurements, in a manner analogously to that described above.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

The invention claimed is:

1. A data storage device comprising:
a non-volatile storage medium configured to store user data;
a data port configured to transmit data between a host computer system and the data storage device;
a display control circuit for a display system; and
at least one processor coupled, through a bus, to the non-volatile storage medium, the data port, and the display control circuit, wherein the at least one processor is configured to, alone or in combination:
receive and execute one or more commands from the host computer system to cause a data transfer between the host computer system and the non-volatile storage medium;
monitor data transfer between the data port and the non-volatile storage medium via the bus, wherein monitoring the data transfer comprises:
issuing polling signals to at least one memory buffer configured to transfer data through the bus to the non-volatile storage medium;
determining, from the polling signals, data exchanged between the at least one memory buffer and the bus; and
determining, based on the data exchanged, an input/output (IO) rate parameter of data transfers on the bus at a memory interface to the non-volatile storage medium and caused by the execution of the one or more commands by the at least one processor;
generate, based on the IO rate parameter, performance data representing performance of the data storage device, wherein the performance data includes an efficiency ratio value representing a relative utilization of an operational capability of the data storage device in conducting the data transfer; and generate one or more control signals to cause the display system to visually indicate at least the efficiency ratio value of the performance data.

2. The data storage device of claim 1, wherein the efficiency ratio value is determined as a current value of the IO rate parameter of the data storage device against a corresponding maximum capability value of the IO rate parameter, as associated with the data transfer.

3. The data storage device of claim 2, wherein the IO rate parameter is selected from:
a data throughput of the data transfer; or
an input/output operations per second (IOPS) of the data transfer.

4. The data storage device of claim 1, wherein executing the one or more commands comprises generating and transmitting data access control signals through the bus to access data on the non-volatile storage medium for the data transfer.

5. The data storage device of claim 1, wherein the at least one memory buffer comprises:
a write buffer configured to receive user data for executing write commands; and
a read buffer configured to receive user data for executing read commands.

6. The data storage device of claim 2, wherein:
the at least one processor is further configured to, alone or in combination, determine an access pattern to characterize the storage and retrieval operations associated with the data transfer to determine the current value of the IO rate parameter; and
the access pattern comprises one or more of:
a random/sequential access designation;
a block size; and
a read/write operation ratio.

7. The data storage device of claim 3, wherein the corresponding maximum capability value of the IO rate parameter is determined based on one or more properties of the data storage device.

8. The data storage device of claim 7, wherein the corresponding maximum capability value of the IO rate parameter is one of:
a maximum data throughput supported by the data storage device; and
a maximum total IOPS supported by the data storage device.

9. The data storage device of claim 8, wherein the maximum data throughput is determined by a host interface data rate.

10. The data storage device of claim 6, wherein the corresponding maximum capability value of the IO rate parameter is determined based on the determined access pattern characterizing the storage and retrieval operations associated with the data transfer.

11. The data storage device of claim 10, wherein the at least one processor is further configured to, alone or in combination:
determine, based on one or more prior access patterns of corresponding prior data transfers between the host computer system and the data storage device, a set of one or more workload profiles associated with the host computer system for the data storage device;
process the determined access pattern to determine an estimated workload profile of the host computer system by matching the access pattern against the set of one or more workload profiles; and determine the corresponding maximum capability value of the IO rate parameter based on the estimated workload profile.

12. The data storage device of claim 2, wherein the performance data includes an availability value representing an un-utilized portion of the operational capability of the data storage device.

13. The data storage device of claim 12, wherein the availability value is an availability ratio value determined as 1.0 minus the efficiency ratio value.

14. The data storage device of claim 12, wherein the availability value is a difference between the current value of the IO rate parameter and the corresponding maximum capability value of the IO rate parameter.

15. The data storage device of claim 2, wherein:
the display system includes one or more display indicators; and
the display control circuit is configured to:
receive, from the at least one processor, one or more display control signals; and
process the display control signals to cause at least one of the one or more display indicators to display a representation of at least the efficiency ratio value of the performance data.

16. The data storage device of claim 15, wherein:
the display system includes:
a first display indicator being an absolute performance indicator; and
a second display indicator being a relative performance indicator;
the display control circuit is further configured to process the display control signals to cause:
the first display indicator to perform first display operations to display a representation of the current value of the IO rate parameter of the performance data; and
the second display indicator to perform second display operations to display a representation of the efficiency ratio value of the performance data; and
the respective display operations of the first display indicator and the second display indicator are synchronized.

17. The data storage device of claim 1, wherein:
the at least one processor is further configured to, alone or in combination, transmit the performance data to the host computer system; and
the host computer system is configured to visually indicate the efficiency ratio value on a display component of the host computer system.

18. The data storage device of claim 2, wherein the efficiency ratio value is one of:
a device power utilization ratio determined based on a power consumption type operational parameter; and
a device thermal emission ratio determined based on a thermal reading type operational parameter.

19. A method comprising:
receiving and executing, by a controller in a data storage device, one or more commands from a host computer system to cause a data transfer between the host computer system and a non-volatile storage medium of the data storage device, wherein the controller is coupled, through a bus, to the non-volatile storage medium, a data port in communication with the host computer system, and a display control circuit of a display system;
monitoring, by the controller, data transfer between the data port and the non-volatile storage medium via the bus, wherein monitoring the data transfer comprises:

issuing polling signals to at least one memory buffer configured to transfer data through the bus to the non-volatile storage medium;

determining, from the polling signals, data exchanged between the at least one memory buffer and the bus; and determining, based on the data exchanged, an input/output (IO) rate parameter of data transfers on the bus at a memory interface to the non-volatile storage medium and caused by the execution of the one or more commands by the controller;

generating, by the controller and based on the IO rate parameter, performance data representing performance of the data storage device, wherein the performance data includes an efficiency ratio value representing a relative utilization of an operational capability of the data storage device in conducting the data transfer; and generating, by the controller, one or more control signals to cause the display system of the data storage device to visually indicate at least the efficiency ratio value of the performance data.

20. A data storage device comprising:

a non-volatile storage medium configured to store user data;

a data port configured to transmit data between a host computer system and the data storage device;

means for display; and means, coupled through a bus to the non-volatile storage medium, the data port, and the means for display, for:

receiving and executing one or more commands from the host computer system to cause a data transfer between the host computer system and the non-volatile storage medium;

monitoring data transfer between the data port and the non-volatile storage medium via the bus, wherein monitoring the data transfer comprises:

issuing polling signals to at least one memory buffer configured to transfer data through the bus to the non-volatile storage medium;

determining, from the polling signals, data exchanged between the at least one memory buffer and the bus; and determining, based on the data exchanged, an input/output (IO) rate parameter of data transfers on the bus at a memory interface to the non-volatile storage medium and caused by the execution of the one or more commands by the means for receiving and executing the one or more commands;

generating, based on the IO rate parameter, performance data representing performance of the data storage device, wherein the performance data includes an efficiency ratio value representing a relative utilization of an operational capability of the data storage device in conducting the data transfer; and generating one or more control signals to cause the means for display to visually indicate at least the efficiency ratio value of the performance data.

* * * * *